United States Patent
Kato et al.

(10) Patent No.: US 7,990,555 B2
(45) Date of Patent: Aug. 2, 2011

(54) IMAGE SUPPLY DEVICE AND CONTROL METHOD THEREOF AND PRINTING SYSTEM

(75) Inventors: Masao Kato, Kawasaki (JP); Futoshi Sasaki, Kawasaki (JP); Ryuichi Kobayashi, Ohta-ku (JP); Nobuo Onuma, Yokohama (JP); Ruriko Mikami, Kunitachi (JP); Akinori Horiuchi, Yokohama (JP); Yoshiro Udagawa, Minamisaitama (JP); Kenji Takahashi, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 871 days.

(21) Appl. No.: 11/206,067

(22) Filed: Aug. 18, 2005

(65) Prior Publication Data
US 2006/0039021 A1 Feb. 23, 2006

(30) Foreign Application Priority Data
Aug. 20, 2004 (JP) .................................. 2004-241203

(51) Int. Cl.
*G06F 3/12* (2006.01)
*G06K 15/33* (2006.01)
*H04N 1/60* (2006.01)
*H04N 1/46* (2006.01)

(52) U.S. Cl. ........ 358/1.15; 358/1.13; 358/1.3; 358/1.9; 358/500; 347/19

(58) Field of Classification Search ............... 386/112; 358/1.13, 1.16, 1.14, 1.15; 348/207.2, 201; 347/19
See application file for complete search history.

(56) References Cited

U.S. PATENT DOCUMENTS

| | | | | |
|---|---|---|---|---|
| 5,636,316 A * | 6/1997 | Oku et al. | ...................... | 386/112 |
| 6,115,137 A * | 9/2000 | Ozawa et al. | .................. | 358/1.6 |
| 6,882,440 B1 * | 4/2005 | Nitta | ............................ | 358/1.16 |
| 6,932,523 B1 * | 8/2005 | Yamada et al. | ................. | 400/78 |
| 6,970,263 B2 | 11/2005 | Suzuki et al. | ................ | 358/1.15 |
| 7,173,728 B2 | 2/2007 | Suzuki et al. | ................ | 358/1.15 |
| 7,433,544 B2 * | 10/2008 | Lin et al. | ....................... | 382/299 |
| 2003/0016378 A1 * | 1/2003 | Ozawa et al. | ................ | 358/1.13 |
| 2003/0085942 A1 * | 5/2003 | Narusawa et al. | .............. | 347/19 |
| 2003/0137687 A1 * | 7/2003 | Onuma | ........................ | 358/1.14 |
| 2003/0156196 A1 * | 8/2003 | Kato et al. | ................. | 348/207.2 |
| 2003/0231341 A1 | 12/2003 | Aichi et al. | .................. | 358/1.15 |

(Continued)

FOREIGN PATENT DOCUMENTS
EP 0 869 656 10/1998
(Continued)

OTHER PUBLICATIONS
Byte Report of NIKKEI BYTE, Jan. 2003 Issue (whole English-language translation enclosed).
(Continued)

*Primary Examiner* — Chan S Park
*Assistant Examiner* — Akwasi M Sarpong
(74) *Attorney, Agent, or Firm* — Fitzpatrick, Cella, Harper & Scinto

(57) ABSTRACT

According to a print system, a printer supplies function information of the printer to a DSC based on a communication link between the DSC and the printer, and the DSC establishes a UI based on the supplied function information to display it on the DSC. The DSC converts image data of an image file according to print conditions set up based on the UI and the function information of the printer and transmits the converted image file to the printer.

15 Claims, 12 Drawing Sheets

U.S. PATENT DOCUMENTS

| | | | |
|---|---|---|---|
| 2004/0184078 A1* | 9/2004 | Endo et al. | 358/1.15 |
| 2005/0012954 A1 | 1/2005 | Onuma et al. | 358/1.13 |
| 2005/0052676 A1 | 3/2005 | Masumoto et al. | 358/1.13 |
| 2005/0052690 A1 | 3/2005 | Masumoto et al. | 358/1.15 |
| 2005/0057772 A1 | 3/2005 | Mikami et al. | 358/1.15 |
| 2007/0030517 A1* | 2/2007 | Narayanan | 358/1.15 |

FOREIGN PATENT DOCUMENTS

| | | |
|---|---|---|
| EP | 1 370 060 | 12/2003 |
| JP | 8-32911 | 2/1996 |
| JP | 10-173833 | 6/1998 |
| JP | 10-290470 | 10/1998 |
| JP | 2002/014781 | 1/2002 |
| JP | 2003-134457 | 5/2003 |
| JP | 2004-013349 | 1/2004 |
| JP | 2004-070611 | 3/2004 |
| KR | 2003-0094512 | 12/2003 |
| WO | WO 2004/013750 | 2/2004 |

OTHER PUBLICATIONS

Japanese Office Action dated Nov. 6, 2007 in corresponding Japanese Application No. 2004-241203.

"White Paper of CIPA DC-001-2003 Digital Photo Solutions for Imaging Devices", published by Camera & Imaging Products Association, Feb. 3, 2003.

"PIMA15740:2000 Photography—Electronic Still Picture Imaging—Picture Transfer Protocol (PTP) for Digital Still Photography Devices", published by Photographic and Imaging Manufacturers Association, Inc., Jul. 5, 2000.

* cited by examiner

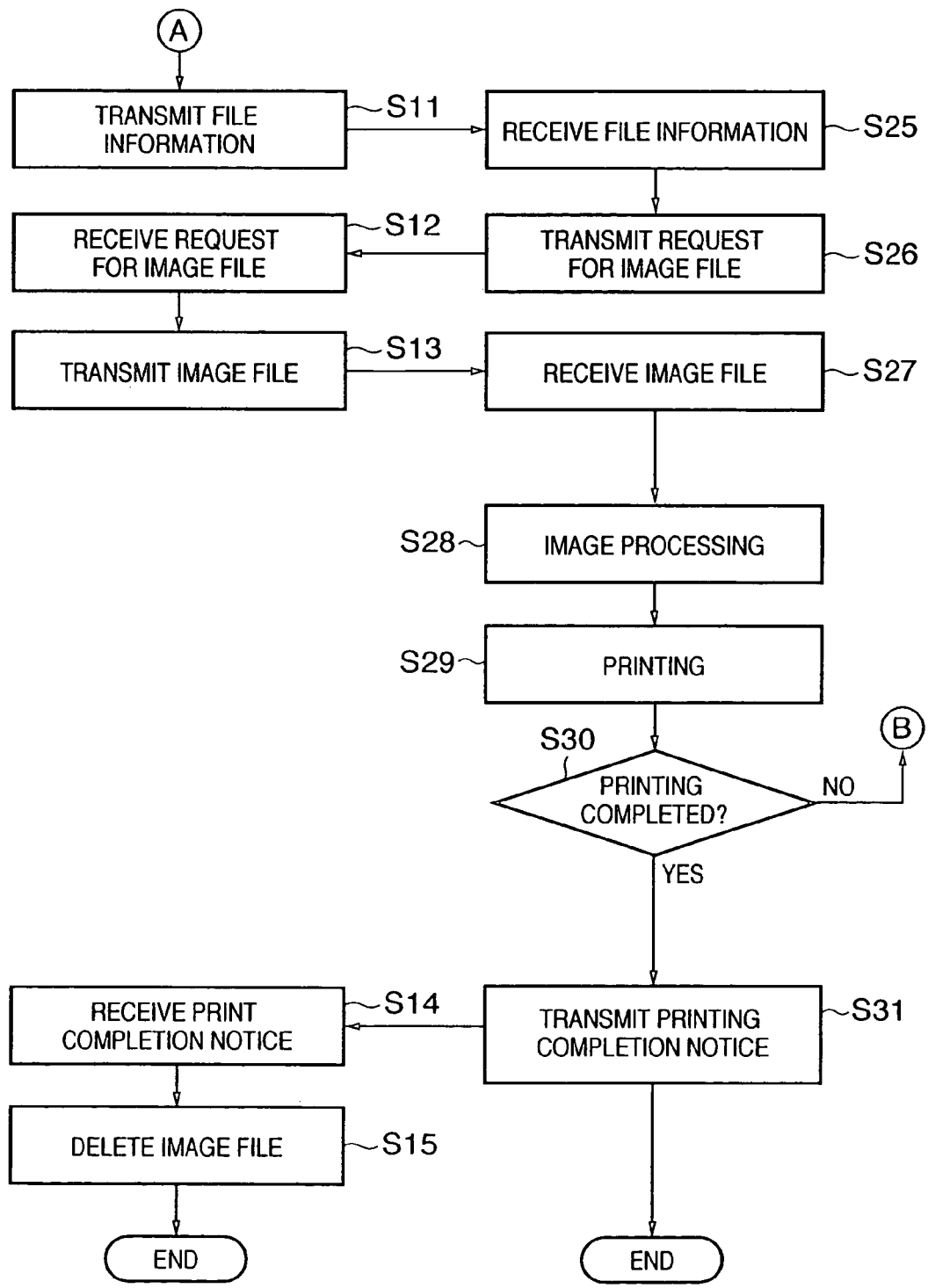

IMAGE SUPPLY DEVICE AND CONTROL METHOD THEREOF AND PRINTING SYSTEM

FIELD OF THE INVENTION

The present invention relates to a printing system, comprising an image supply device and a printer, for printing an image with the printer based on image data supplied from the image supply device, and the image supply device and a control method of the device.

BACKGROUND OF THE INVENTION

A so-called digital camera direct print system is becoming common, which directly connects a printer to a digital still camera (hereafter a DSC) via an interface such as a USB and transmits a photographic image stored in a storage medium (memory card) of the DSC to the printer to print it.

In such a print system, a JPEG file of an image to be printed is generally transmitted to the printer from the DSC, and the JPEG file is decompressed, color-converted and resized on the printer side so as to print it by converting it to a printable data format.

As for the DSC, there is a proposed system for processing a photographed image specifically for a print and then transmitting it to the printer to print it.

Japanese Patent Laid-Open No. 8-32911 proposes a digital camera direct print system capable of, by using a unique protocol which is not general, printing an image from the DSC and an image according to a printing aspect such as a paper size on the printer side.

As for Japanese Patent Laid-Open No. 10-290470, an object thereof is to reduce a processing load on a printer, where the JPEG file is decompressed, color-converted and resized by the DSC to convert it to the printable data format so that the converted data is transmitted as printable data to the printer to reduce an image processing load on the printer.

Furthermore, as for Japanese Patent Laid-Open No. 2003-134457, variations in color reproduction characteristics of each printer are corrected on the DSC side to be converted to a general image file such as JPEG and transmitted to the printer. It is thereby possible, according to its description, to obtain a stable image not dependent on printing characteristics of each printer.

The digital camera direct print system is becoming increasingly common because of a communication protocol providing a communication procedure of the above-mentioned digital camera direct print system. Furthermore, there is a remarkable progress as to improvement in image quality of the DSC. Image data sensed and stored by the DSC was 1 million to 2 million pixels per image at the maximum until some years ago. In recent years, however, the DSCs capable of shooting and storing high-resolution images of 8 million or more pixels per image are on sale.

In conjunction with such an increase in the number of pixels of the DSC, the inventors have discovered the following new problems as to the above-mentioned digital camera direct print system.

(1) The number of pixels to be processed on the printer side increases, so that the load on the printer increases.

(2) Size of the image file becomes larger in proportion to the number of pixels so that a transfer load of the image file between the DSC and the printer increases.

Because of these factors, there is a problem arising that print speed is reduced when printing.

It has been newly found out that there are the problems in the case of performing a part of image processing of the image data for printing on the DSC side for the purpose of load sharing of processing, such as the above-referenced well known examples. In any of the well known examples, there is a description to the effect that the printing specification and printing characteristics of the printer are obtained from the printer while there is no concrete description as to a method of communicating information on the printing characteristics of the printer between the printer and the DSC. For instance, in the case of a technique for conveying printing capability of the printer to the DSC in a PictBridge, it is possible for a user, on the DSC side, to arbitrarily set up and select the size and layout on printing on the printer within the capability of the printer. In the case of such a system, however, printing conditions of the printer are not always appropriately set up just by the capability from the printer. As for Japanese Patent Laid-Open No. 8-32911 in particular, the printer notifies the DSC of a currently printable conditions so that the DSC changes the printing conditions accordingly. For instance, it is described that, if A4 paper is set on the printer, the printer having a paper size detecting function automatically notifies the DSC of the paper size of A4. In the case where the printer has no paper size detecting function, the paper size is selected on a panel of the printer so as to notify the selected result thereof to the DSC. In any of the cases, however, only the current printable conditions recognized by the printer is notified to the DSC, but the desired print characteristics of the user on the DSC are not always reflected to the printed matter. For example, consideration is given to the case of having the A4 paper set on the printer and transmitting from the DSC the image data to be printed in a larger size than A4 if printed at a resolution of the printer. In this case, the transmitted image data is too large to be in the size of A4 and is printed in a state of having its periphery chipped.

As for Japanese Patent Laid-Open No. 10-290470 and Japanese Patent Laid-Open No. 2003-134457, there is a description to the effect that the printing characteristics of the printer are obtained from the printer. However, the image data transmitted to the printer is converted based only on the obtained printing characteristics, and so there is no description as to performing the image processing and print processing desired by the user.

SUMMARY OF THE INVENTION

An object of the present invention is to resolve the drawbacks of the conventional techniques.

The feature of the present invention is to provide an image supply device for transmitting to a printer image data to be transmitted to the printer, after processing it on the image supply device according to printing conditions set up by the image supply device based on function information from the printer and the function information, a control method and a printing system thereof.

According to an aspect of the present invention, there is provided a printing system having an image supply device and a printer, for printing an image with the printer based on image data supplied from the image supply device, wherein:

the image supply device comprises:

means for obtaining function information of the printer according to a communication between the image supply device and the printer;

means for establishing a UI based on the function information and displaying the UI;

conversion means for converting image data of an image file to be printed according to print conditions set up using the UI and the function information; and transmission means for transmitting the image data converted by the conversion means to the printer in response to a data request from the printer, wherein the printer prints an image based on the image data transmitted by the transmission means in response to the data request.

Other features, objects and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 6A and 6B are diagrams for describing a process in the case of performing communication between a digital camera (DSC) and the PD printer and supplying image data from the DSC to the PD printer to perform printing according to the first embodiment of the present invention;

DETAILED DESCRIPTION OF THE PREFERRED EMBODIMENTS

Preferred embodiments of the present invention will now be described in detail with reference to the accompanying drawings. It should be noted that the embodiments that follow do not limit the invention set forth in the claims and that all combinations of features described in the embodiments are not necessarily essential as means for attaining the invention. This embodiment will be described as to the case of using PictBridge for implementing direct print between a digital camera (DSC) and a printer. However, the present invention is not limited thereto.

Figure 1:
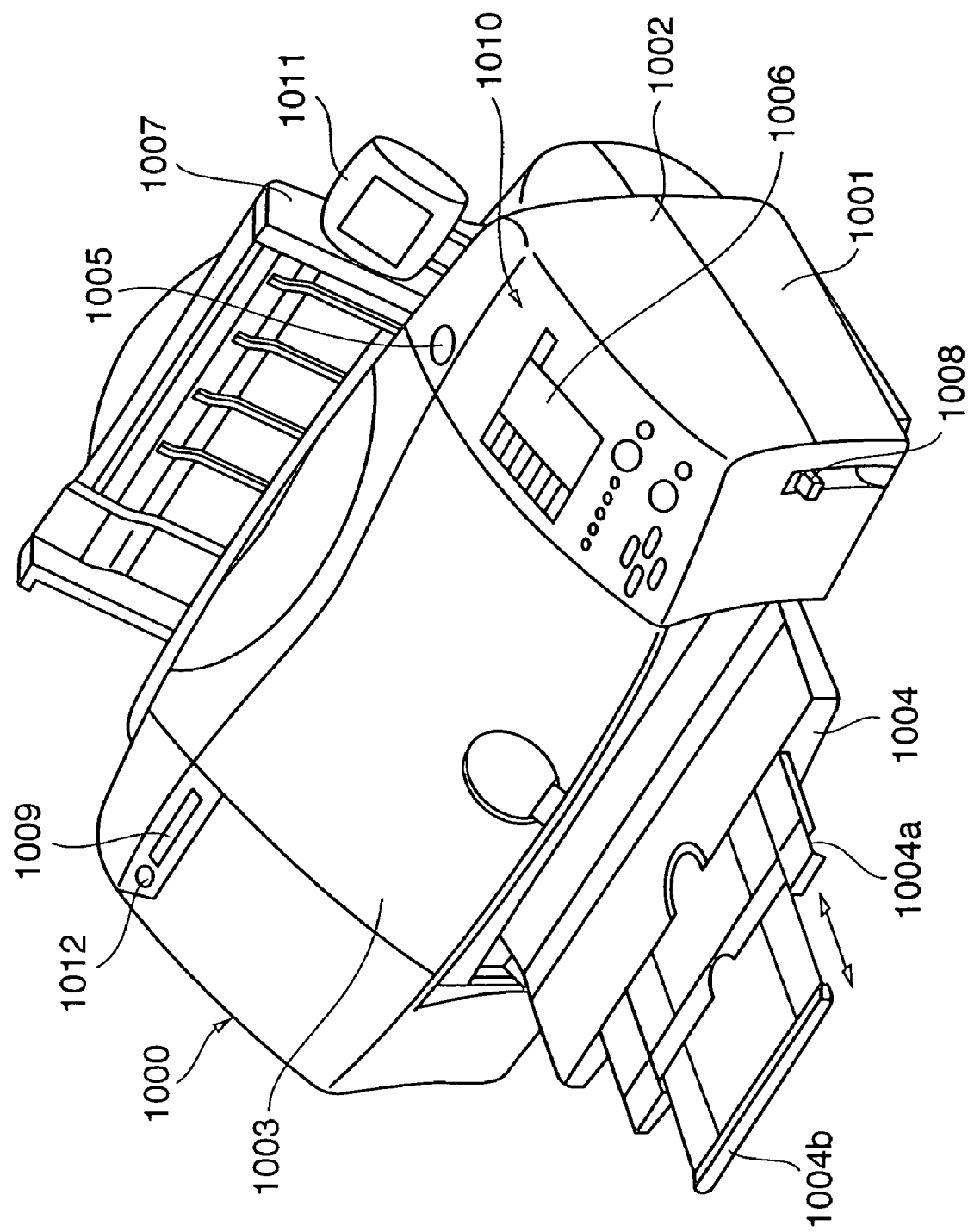
FIG. 1 depicts a perspective view of a PD printer according to an embodiment of the present invention.

FIG. 1 depicts a perspective view of a photo-direct printer (hereinbelow, PD printer) 1000 according to an embodiment of the present invention. The PD printer 1000 has a general PC printer function of receiving data from a host computer (PC) and print-outputting the data, and a function of directly reading image data stored in a storage medium such as a memory card or receiving image data from a digital camera and performing printing.

In FIG. 1, the main body as an outer shell of the PD printer 1000 has a lower case 1001, an upper case 1002, an access cover 1003 and a discharge tray 1004. The lower case 1001 forms an approximate lower half part of the PD printer 1000, and the upper case 1002 forms an approximate upper half part of the main body. The combination of both cases produces a hollow structure having accommodation space for respective mechanisms to be described later. The structure has openings in its upper surface and front surface. Further, the discharge tray 1004 is rotatably held at its one end in the lower case 1001. The rotation of the discharge tray 1004 opens/closes the opening in the front surface of the lower case 1001. In this arrangement, upon execution of print operation, the discharge tray 1004 is rotated to the front surface side to open the opening, thereby print sheets can be discharged from the opening and the discharge print sheets can be sequentially stacked. The discharge tray 1004 includes two auxiliary trays 1004a and 1004b. The sheet support area of the discharge tray 1004 can be expanded or reduced in three steps by pulling out the respective trays in accordance with necessity.

The access cover 1003, rotatably held at its one end in the upper case 1002, opens/closes the opening formed in the upper surface. When a printhead cartridge (not shown), an ink tank (not shown) or the like accommodated in the main body is exchanged, the access cover 1003 is opened. Note that although not particularly shown, when the access cover 1003 is opened/closed, a projection formed on the rear surface of the access cover 1003 rotates a cover opening/closing lever with a micro switch or the like. The open/close status of the access cover 1003 can be detected by detecting the rotated position of the lever.

A power key 1005 is provided on the upper surface of the upper case 1002. Further, an operation panel 1010 having a liquid crystal display 1006, various key switches and the like, is provided on the right side of the upper case 1002. The structure of the operation panel 1010 will be described in detail with reference to FIG. 2. Reference numeral 1007 denotes an automatic feeder which automatically feeds print sheets into the apparatus main body. Numeral 1008 denotes a sheet interval selection lever to control the interval between a printhead and a print sheet. Numeral 1009 denotes a card slot into which an adapter, to which a memory card is attachable, is inserted. Image data stored in the memory card is directly read via the adapter and print-outputted. As the memory card (PC), compact flash (registered trademark) memory, smart media, memory stick and the like may be used. Numeral 1011 denotes a viewer (liquid crystal display) attachable/removable to/from the PD printer 1000 main body. In a case where the PC card is searched for an image to be printed, images are displayed by 1 frame or index images are displayed on the viewer. Numeral 1012 denotes a USB terminal for connection with a digital camera to be described later. Further, a USB connector for connection with a personal computer (PC) is provided on a rear surface of the PD Printer 1000.

Figure 2:
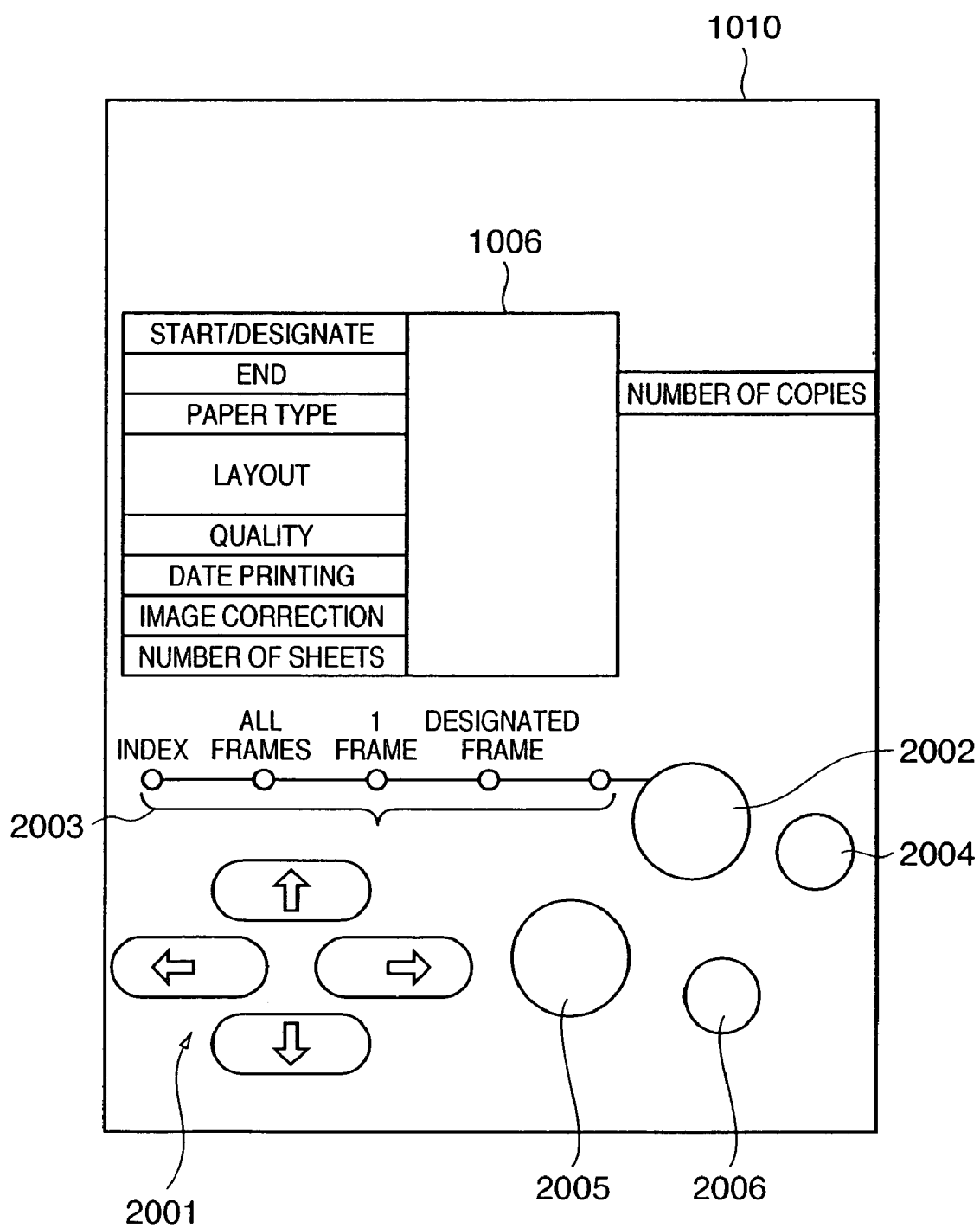
FIG. 2 depicts an overview diagram of an operation panel of the PD printer according to the embodiment.

FIG. 2 depicts a schematic view showing the operation panel 1010 of the PD printer 1000 according to the present embodiment.

In FIG. 2, the liquid crystal display 1006 displays a menu items for various settings of data regarding items printed on left and right sides. The displayed items include, e.g., a head picture number of plural image files to be printed, a designated frame number (start frame designation/print frame designation), a last picture number to be printed (end), the number of printouts (copies), the type of paper (print sheet) used in printing (paper type), the number of pictures printed on one sheet (layout), designation of printing quality (quality), designation as to whether or not date of photographing is to be printed (date printing), designation as to whether or not picture correction is made before printing (image correction), the number of necessary print sheets (number of sheets) and the like. The respective items are selected or designated with a cursor key 2001. Numeral 2002 denotes a mode key. The type of printing (index printing, all frame printing, one frame printing and the like) is changed by each depression of the mode key 2002, and a corresponding LED of the LED 2003 is turned on. Numeral 2004 denotes a maintenance key for performing printer maintenance such as cleaning of the print head; numeral 2005 denotes a print start key which is depressed to designate the start of printing or establish maintenance setting; and numeral 2006 denotes a print stop key which is depressed to stop printing or designate to stop a maintenance processing.

Figure 3:
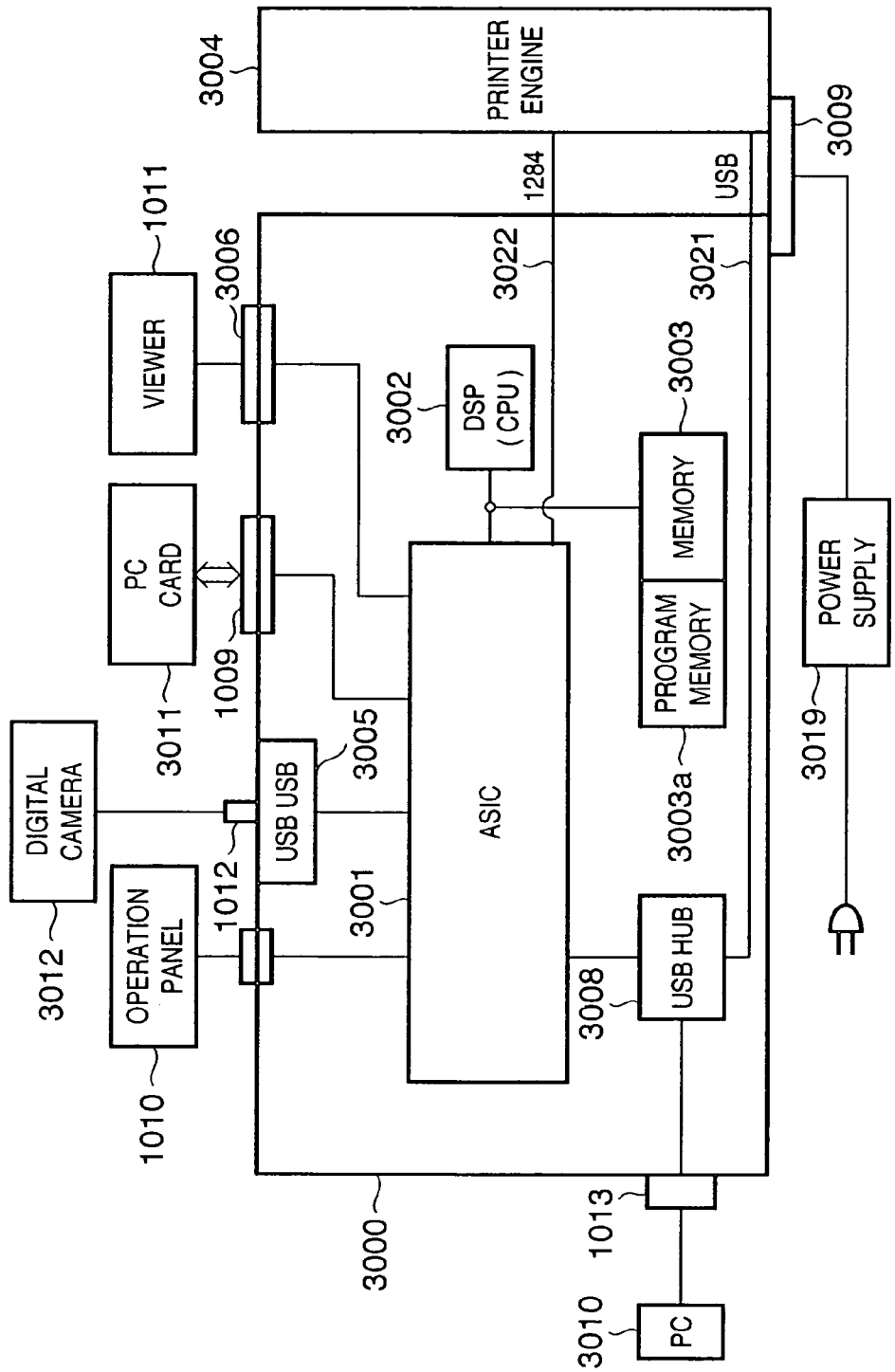
FIG. 3 is a block diagram showing a configuration of a major portion related to control of the PD printer according to the embodiment.

Next, the arrangement of the principal elements concerning control of the PD printer 1000 according to the present embodiment will be explained with reference to FIG. 3. In FIG. 3, elements corresponding to those in the above-described figures have the same reference numerals, and explanations thereof will be omitted.

In FIG. 3, numeral 3000 denotes a controller (control board); numeral 3001 denotes an ASIC (application specific LSI); numeral 3002 denotes a DSP (Digital Signal Processor) which incorporates a CPU and performs various control processings to be described later and image processings such as conversion from luminance (RGB) signals to density (CMYK) signals, scaling, gamma conversion, and error diffusion; numeral 3003 denotes a memory having a program memory 3003a for storing the control program for the CPU of the DSP 3002, a RAM area for storing variables and the like upon execution of program, and a memory area functioning as a work memory for storing image data and the like; numeral 3004 denotes a printer engine which is an ink-jet print type printer engine for printing a color image by using a plurality of color inks; numeral 3005 denotes a USB connector serving as a port for connection with a digital camera (DSC) 3012; numeral 3006 denotes a connector for connection with the viewer 1011; and numeral 3008 denotes a USB hub which transmits data from a PC 3010 to the printer engine 3004 via a USB 3021 when the PD printer 1000 performs printing based on image data from the PC 3010. Thus, the connected PC 3010 can directly exchange data and signals with the printer engine 3004 and execute printing (functions as a general PC printer). Numeral 3009 denotes a power connector which receives a DC voltage converted from a commercial AC voltage from a power supply 3019. The PC 3010 is a general personal computer; numeral 3011 denotes the above-described memory card (PC card); and numeral 3012 denotes the digital camera (DSC: Digital Still Camera).

Note that signal exchange between the controller 3000 and the printer engine 3004 is performed via the above-described USB 3021 or an IEEE 1284 bus 3022.

<Overview Description of Digital Camera>

Figure 4:
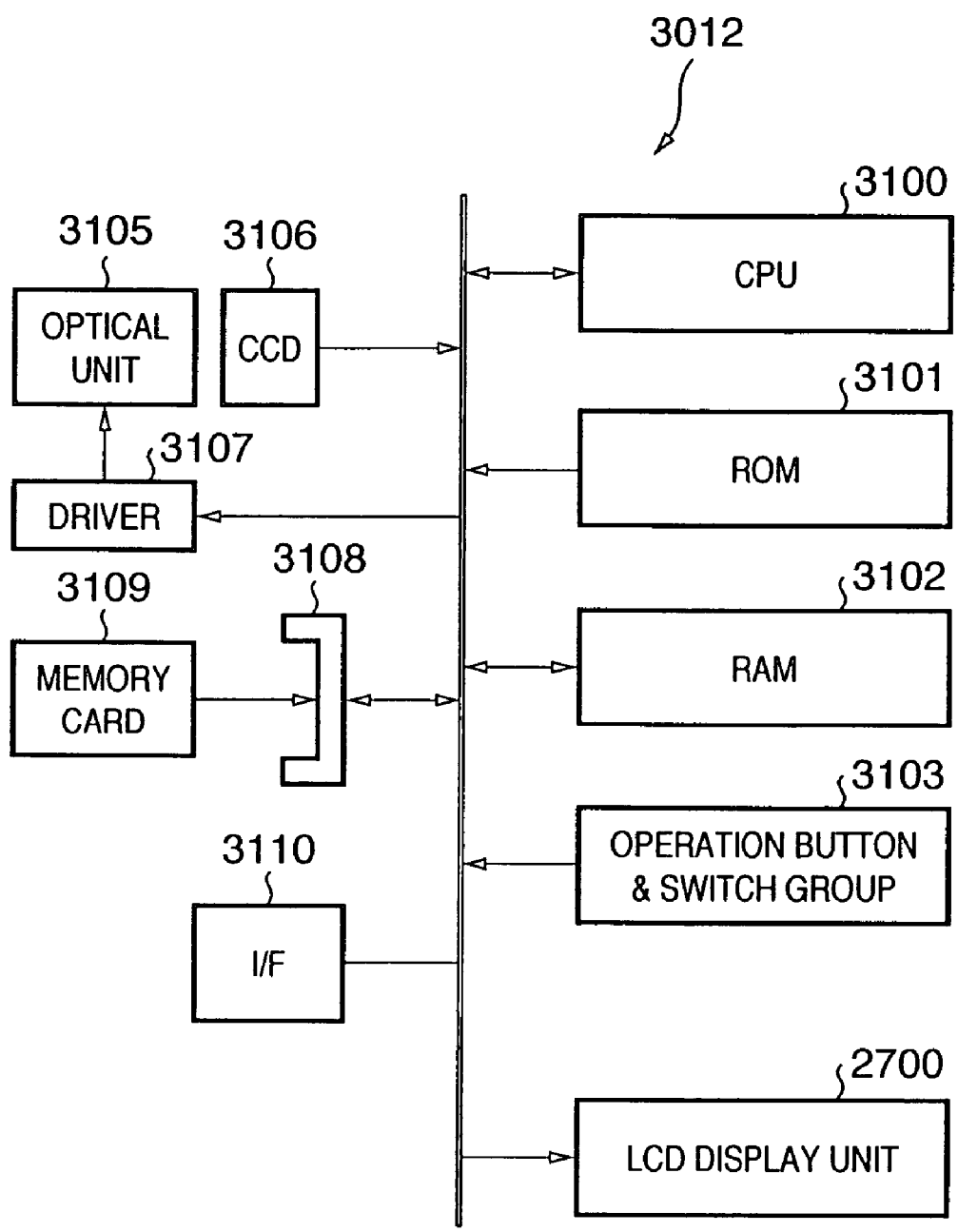
FIG. 4 is a block diagram showing the configuration of a DSC according to the embodiment.

FIG. 4 is a block diagram showing the construction of a DSC (digital camera) 3012 according to the present embodiment.

In FIG. 4, numeral 3100 denotes a CPU which controls the overall DSC 3012; numeral 3101 denotes a ROM holding a processing procedure by the CPU 3100; numeral 3102 denotes a RAM used as a work area for the CPU 3100; numeral 3103 denotes a switch group for various operations including various switches and cursor keys; numeral 2700 denotes a liquid crystal display to display a currently-sensed video image, images already obtained by image sensing and stored, or to made various settings (UI image); numeral 3105 denotes an optical unit mainly comprising a lens and its drive system; numeral 3106 denotes a CCD device; numeral 3107 denotes a driver to drive-control the optical unit 3105 under the control of the CPU 3100; numeral 3108 denotes a connector for connection with the storage medium 3109 (compact flash (registered trademark) memory card, smart media and the like); and numeral 3110 denotes a USB interface (on the USB slave side) for connection with the PC or the PD printer 1000 in the present embodiment.

<Overview Description of Direct Print>

Figure 5:
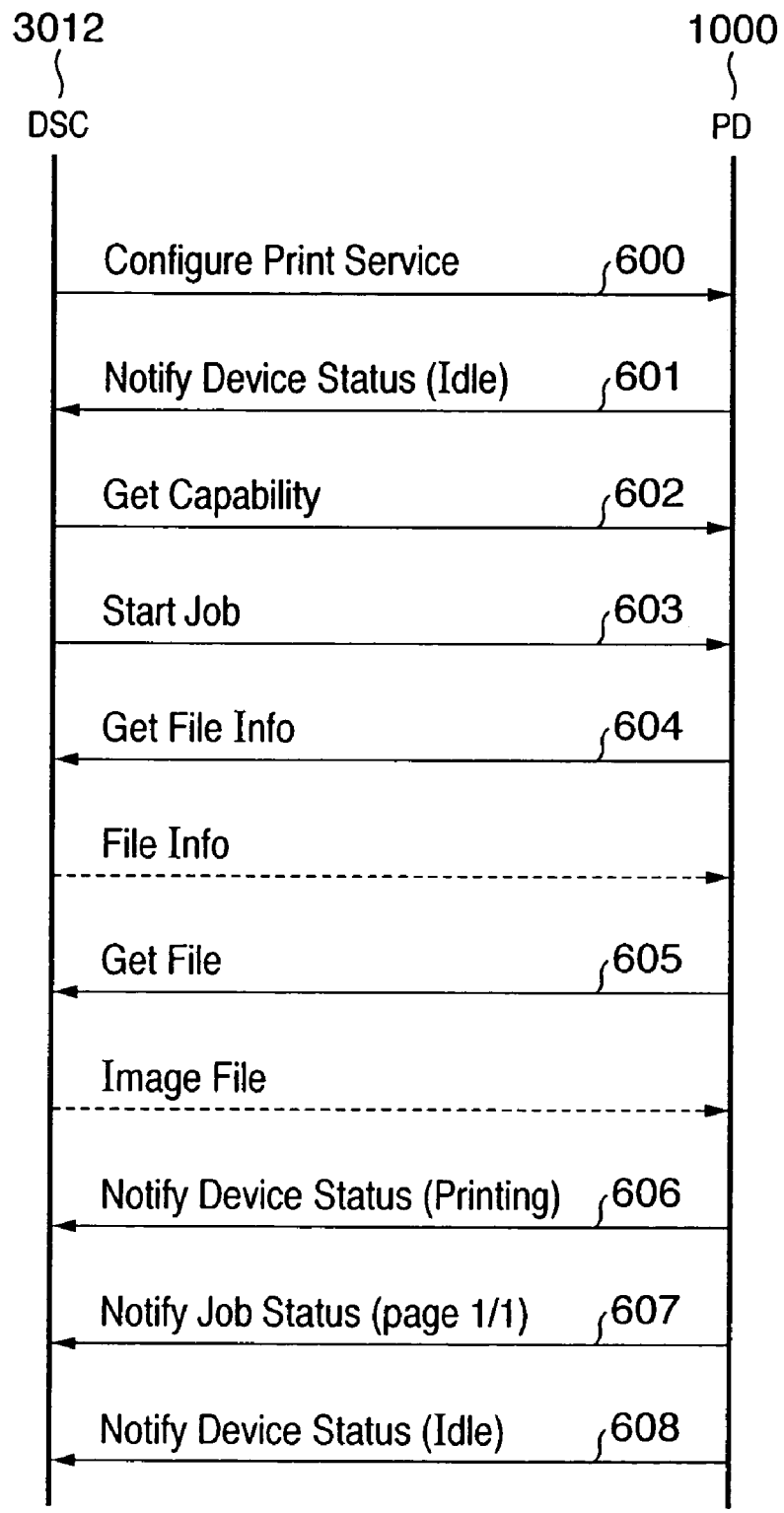
FIG. 5 is a diagram for describing a rough signal flow in the case of issuing a print request from the DSC to the PD printer and performing printing in a printing system according to the embodiment.

FIG. 5 is a diagram for describing a rough signal flow in the case of issuing a print request from the DSC 3012 to the PD printer 1000 and performing printing in a printing system adopting the above-mentioned PictBridge.

This procedure is implemented after connecting the PD printer 1000 to the DSC 3012 via a USB cable or after mutually confirming compliance with DPS specifications by performing radio communication. First, the DSC 3012 transmits "ConfigurePrintService" to the PD printer 1000 so as to check a status of the PD printer 1000 (600). In response, the PD printer 1000 notifies the DSC 3012 of the status of the PD printer 1000 at the time (an "Idle" status in this case) (601). As it is the "Idle" status in this case, the DSC 3012 inquires about Capability (printing functions) of the PD printer 1000 (602) and issues a print start request (StartJob) according to the Capability (603). This print start request is issued from the DSC 3012 to the PD printer 1000 on condition that "newJobOK" in status information from the PD printer 1000 described later is "True" in 601.

In response to this print start request, the PD printer 1000 requests file information (information of file) from the DSC 3012 based on a file ID of the image data instructed to print (GetFileInfo) (604). The file information is transmitted from the DSC 3012 in reply. This file information includes the information such as a file capacity. The PD printer 1000 receives the file information and if the printer determines it to be able to process, the printer requests the file to the DSC 3012 (GetFile) (605). Thus, the image data of the requested file (ImageFile) is transmitted from the DSC 3012 to the PD printer 1000. If the PD printer 1000 thereby starts a print process, the status information indicating "Printing" is transmitted by a "NotifyDeviceStatus" from the PD printer 1000 to the DSC 3012 in 606. If the print process of one page is finished, it is notified by a "NotifyJobStatus" 607 from the PD printer 1000 when starting the process of the next page. In the case of printing only one page, on finishing printing the one page requested to print, it is notified next by a "NotifyDeviceStatus" 608 that the PD printer 1000 is now in the "Idle" status (NotifyDeviceStatus(Idle)).

In the case of N-up printing for laying out and printing multiple (N) images on one page for instance, the "NotifyJobStatus" 607 is transmitted from the PD printer 1000 to the DSC 3012 each time in which N images have been printed. Order of timing for issuing the "NotifyJobStatus" and "NotifyDeviceStatus" and acquisition of the image data in this embodiment is just an example, and there are various possible cases depending on implementation of the product.

Figure 6A:
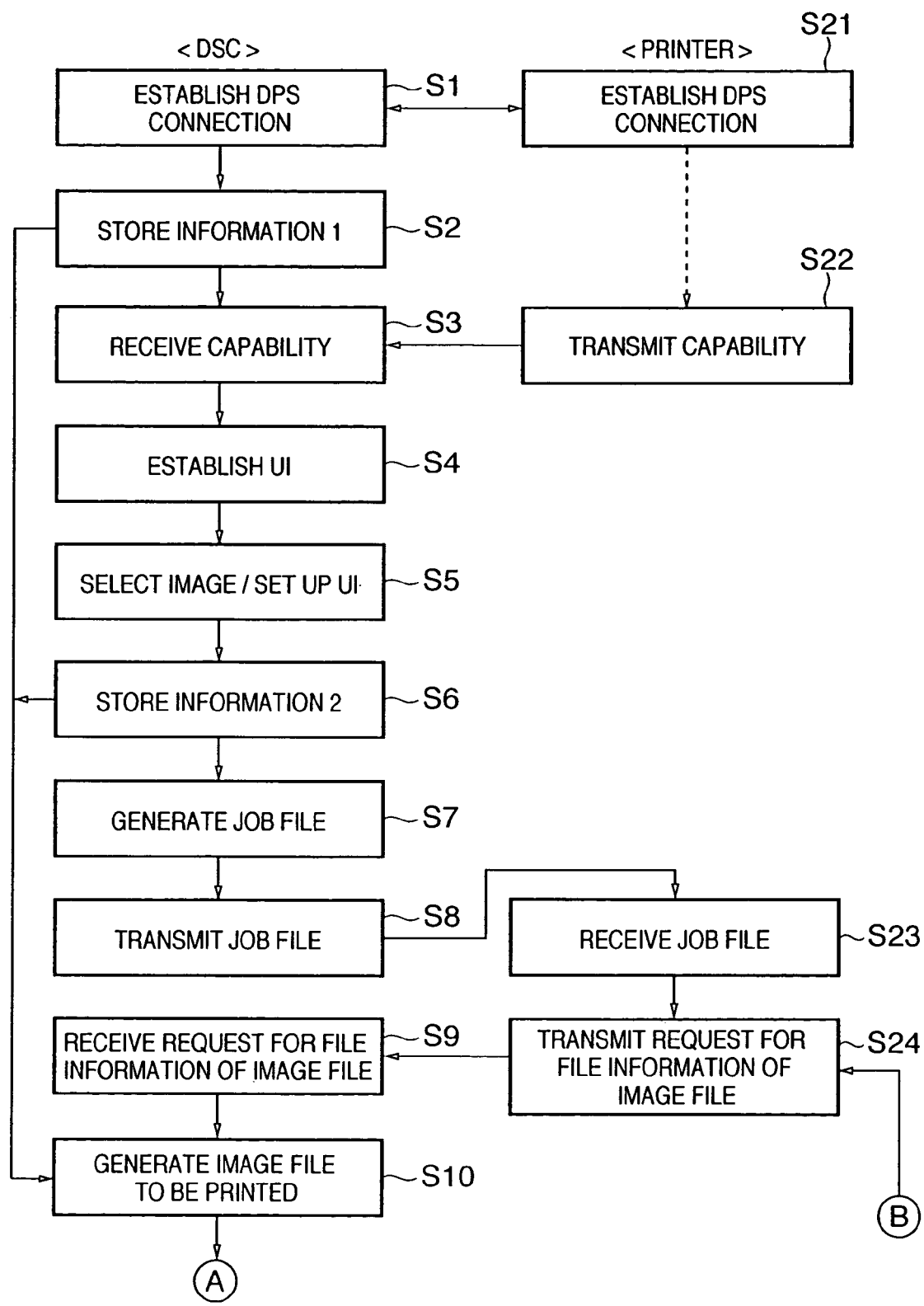

FIGS. 6A and 6B are diagrams for describing the process in the case of performing communication between the digital camera (DSC) 3012 and the PD printer 1000 and supplying the image data from the DSC 3012 to the PD printer 1000 to perform the printing according to the first embodiment of the present invention. In FIGS. 6A and 6B, steps S1 to S15 indicate the processes of the DSC 3012 and steps S21 to S31 indicate the processes of the PD printer 1000.

In the steps S1 and S21, the DSC 3012 and the PD printer 1000 mutually confirm the compliance with the DPS specifications. In this state, the DSC 3012 inquires the PD printer 1000 about the status of the printer and device information. In response, the PD printer 1000 notifies it of the status of the PD printer 1000 and the device information at the time. The device information includes notification of a version of a connection protocol and a vendor name and a type of the printer. Thus, in the step S2, the DSC 3012 stores "information 1" in an RAM 3102 as necessary information out of the printer status and device information. The "information 1" includes the information required when converting the image file on the DSC 3012. Next, the DSC 3012 requests the Capability of the PD printer 1000 as indicated by reference numeral 602 in FIG. 5.

The PD printer 1000 thereby creates capability information (Capability) on printing functions of the PD printer 1000 and transmits it to the DSC 3012 in the step S22. The DSC 3012 receives this Capability (step S3). And the DSC establishes a UI based on this Capability and displays it on a display 2700 in the step S4. Here, for instance, in the case where paper sizes are A4 and B5, the PD printer 1000 has plain paper and photo paper mounted thereon, and layout printing of 1-up, 2-up and 4-up is possible "without a margin" or "with a margin" and date printing is further possible, a UI screen capable of arbitrarily selecting any of the above described items while incapable of selecting any other item is displayed on the display 2700.

Next, in the step S5, the user of the DSC 3012 refers to the established UI screen, selects the images to be printed and sets up a print form and printing conditions of the images. The setup of the print form na d printing conditions of the images are based on the Capability of the PD printer 1000 received in the step S3, such as the number of print sheets, paper size, layout and whether or not there is date printing. Next, in the step S6, it stores "information 2" thus set up by the user in the RAM 3102. The "information 2" includes the information such as the paper size and layout set up by the user by using the UI.

And if instructed to start printing by the user by using the UI, it advances to the step S7 to generate a print job file to give instructions of the printing, and transmits the generated print job file to the PD printer 1000 in the step S8. The print job file is received by the PD printer 1000 in the step S23. Next, in the step S24, the PD printer 1000 analyzes the received print job file to prepare for the print. And the printer issues a "request for image file information" (image file name, size of image file, directory, date of image file, and the like) of a printing subject listed in the print job file to the DSC 3012.

In the case of a service operating on a PTP (Picture Transfer Protocol) on a USB such as PictBridge, the "request for image file information" is equivalent to "GetObjectInfo" provided by the PTP. However, the "request for image file information" in this embodiment plays a role of transmitting the timing for generating the image file from the PD printer 1000 to the DSC 3012. In this embodiment, the "request for image file information" is used as one of the means for transmitting the timing for generation of image file. However, such means is not limited thereto, but another specific command or an existing communication command may also be used. This embodiment is characterized by notifying the timing of "generation of an image file to be printed" from the PD printer 1000 to the DSC 3012.

And if the "request for image file information" is received by the DSC 3012 in the step S9, it advances to the step S10 and performs the process of generating the image file to be printed which is to be transmitted to the PD printer 1000, which characterizes this embodiment. The process of the step S10 will be described in detail later. Next, in the step S11, the information of the generated image file to be printed (including ObjectInfoDataset: image file name, data size, directory, date and so on) is transmitted to the PD printer 1000.

Next, on receiving the image file information in the step S25, the PD printer 1000 transmits the request for the specified image file to be printed itself to the DSC 3012 (step S26). On receiving the request for image file (step S12), the DSC 3012 transmits the requested image file to be printed to the PD printer 1000 in the step S13.

On receiving the image file in the step S27, the PD printer 1000 performs image processing by decoding the image data of the image file so as to convert it to the image in the format to be printed by the PD printer 1000 (step S28). And the printer performs printing based on the converted image data in the step S29. In the step S30, it determines whether or not the printing has been completed to the end of the image data. In the case where the printing has not been completed here, because of, for example, that a buffer area for storing the received image data cannot be sufficiently secured on the PD printer 1000, and the image data of the image file is dividedly received and processed in the step S27. In that case, the process returns to the step S24 and transmits the "request for image file information" to the DSC 3012 again so as to receive and print partial data of the image data of the image file by using the same procedure as previously described in the step S27.

Thus, on completing the printing of the image data of the image file in the step S30, the process advanced to the step S31 to notify the DSC 3012 of completion of the printing of the image file.

On receiving this printing completion notice, the DSC 3012 deletes the image file generated in the step S10 from the RAM 3102 (step S15) to finish the process. However, the original image file stored in a memory card 3109 remains stored as it is.

In the case where, in the aforementioned step S29, an amount of the obtained image data is insufficient, that is, smaller than the amount of data recorded by one scan of a print head for instance, the printing process in the step S29 cannot be performed even if the image processing in the step S28 is possible. In this case, it makes the determination in the step S30 without performing a printing operation in the step S29 and advances to the step S24.

The DSC 3012 transmits the "image file information" to the PD printer 1000 in the step S11 after finishing the generation of the image file in the step S10. This is a response to the "request for image file information" (GetObjectInfo) (step S24) from the PD printer 1000 in the aforementioned step S24. As with the "request for image file information", the "image file information" also plays a role of informing the PD printer 1000 of completion of the conversion and generation of the image file on the DSC 3012. Therefore, transmission of the "image file information" in this embodiment is not limited thereto, but it is also possible to use another specific command or an existing communication command.

Figure 7:
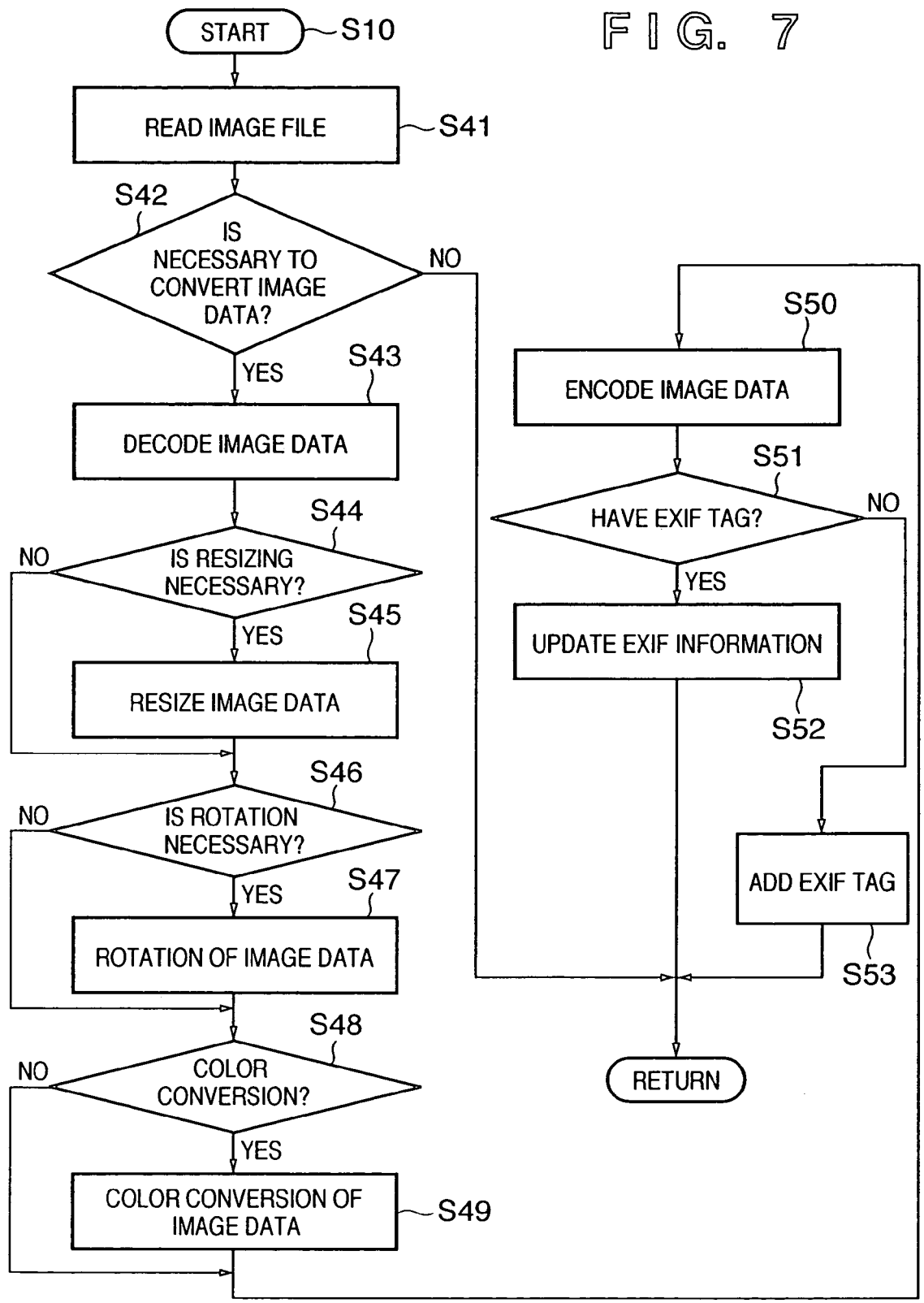
FIG. 7 is a flowchart for describing an image file generation process (step S10) of the DSC according to the embodiment.

FIG. 7 is a flowchart for describing the image file generation process (step S10) of the DSC 3012 according to the first embodiment.

First, in a step S41, it reads the image data of the image file to be processed stored in the memory card 3109. Next, in a step S42, it determines whether or not the image data requires the processes such as resizing (reduction), rotation and color conversion. For example, here, it obtains a resolution and a memory capacity of the PD printer 1000 based on the "information 1" stored in the RAM 3102 in the aforementioned step S2, and obtains the resolution and size of the image to be actually printed based on the "information 2" stored in the step S6 so as to determine whether or not the image data to be printed requires the processes. For example, in the case where the resolution of the image data of the original image file is 8 million pixels, a printing resolution of the PD printer 1000 is 720 dpi, and the image size to be printed is approximately 3×5 mm, it determines that the image data of the original image file of 8 million pixels is not transferred as it is but is reduced (resized) by the DSC 3012 and then transmitted to the PD printer 1000. In addition, it determines whether or not the rotation and color conversion of the image data are necessary according to a print mode of the PD printer 1000.

Thus, if it determines that the original image data requires some conversion in the step S42, it advances to a step S43. Otherwise, it finishes this process without doing anything.

In the step S43, it decodes the original image file which is encoded by JPEG for instance so as to convert it to raw image data. In a step S44, it determines whether or not the resizing of the image is necessary. If necessary, it advances to a step S45 and reduces the data. After implementing the step S45 or if no resizing of the image is necessary in the step S44, it advances to a step S46 to determine whether or not the rotation of the image is necessary. If necessary, it implements the rotation of the image data in a step S47 and advances to a step S48. Otherwise, it advances to the step S48 as it is. In the step S48, it determines whether or not the color conversion of the image is necessary. If not necessary, it advances to a step S50. If necessary, it implements the color conversion of the image in the step S49 and then advances to the step S50.

In the step S50, it JPEG-encodes the processed image data again. Next, it advances to a step S51 and determines if the image data has an "EXIF" tag. If so, in a step S52, it updates the "EXIF" tag according to the contents converted in the steps S45, S47 and S49. In the case where the image data has no "EXIF" tag in the step S51, it advances to a step S53 and adds necessary information as the "EXIF" tag to the image data, such as orientation information indicating an image direction and the image size after the conversion.

In the step S52 for example, the image direction (tag number "274": Orientation) is provided as the information accompanying TIFFRev. 6.0 used for EXIF. According to it, it is provided that "1" (default) is "a 0-th row is (a topmost line of a raster image) a top line of the image, and a 0-th column is the leftmost column of the image". If the image having its image direction provided by "1" is turned to the left by 90 degrees, the image direction of the "EXIF" tag thereof is changed to "8", that is, "the 0-th row becomes the leftmost column of the image, and the 0-th column becomes the bottom line of the image". As for details of the "EXIF" tag, "Image format standards for digital cameras and still cameras (Exif)" of JEIDA Standards should be referred to.

In the above description, the DSC 3012 can obtain the "information 1" such as device information of the printer and also obtain the "information 2" as the information set up by the user of the camera based on the UI according to the functions of the printer so as to store them in the memory. The DSC 3012 can generate the image data to be printed based on such information and transmit it to the printer. It is thereby possible to conform the amount of the image data transmitted from the DSC to the printer and the format thereof to print conditions of the printer. Therefore, it is possible to alleviate a load required to process the image data on the printer and reduce the memory capacity used on the printer on processing the image data. It is also possible to reduce the image data according to the printing on the printer in advance and transmit it to the printer so as to have the effect of decreasing the time required to transmit the image data.

Figure 8:
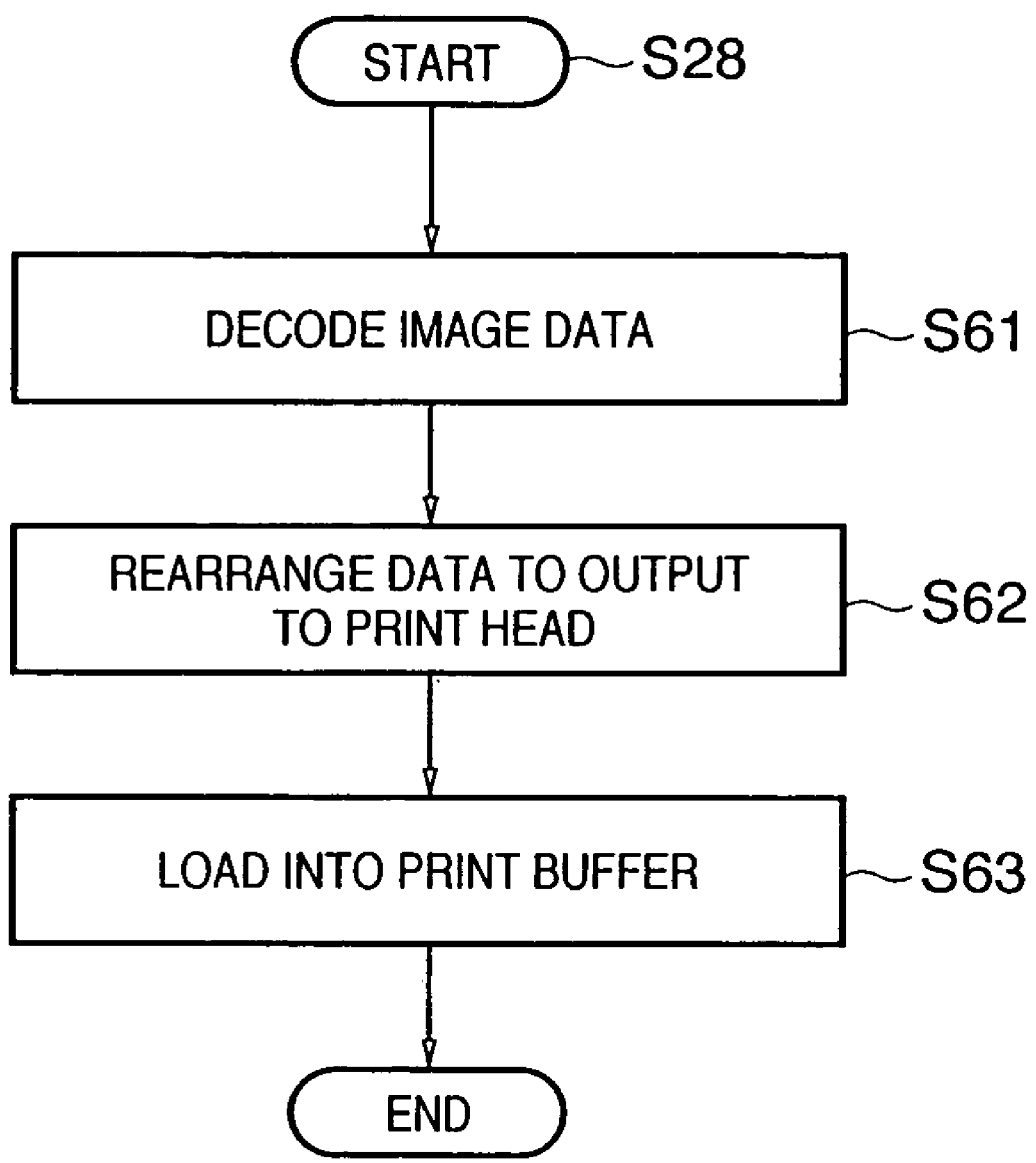
FIG. 8 is a flowchart for describing image data processing (step S28) of the PD printer according to the embodiment.

FIG. 8 is a flowchart for describing the image data processing (step S28) of the PD printer 1000 according to this embodiment.

First, in a step S61, the printer decodes the image data received from the DSC 3012. Next, in a step S62, the printer rearranges the image data in order to output the decoded data to the print head (inkjet head) of the printer engine 3004. And in a step S63, the printer loads the rearranged data into a print buffer.

Thus, according to this embodiment, the resizing, rotation and color conversion of the image data are no longer necessary in the image data processing on the PD printer 1000. Therefore, it is possible to simplify the image processing on the PD printer 1000 and alleviate the load thereof.

As described above, the first embodiment has the following effects.

(1) The image data is transmitted to the PD printer 1000 after performing the processes such as the rotation and resizing of the image data on the DSC 3012. Therefore, there is no need to provide a special and expensive image processing function to the PD printer 1000 and besides, the image processing thereof can be simplified. It is thereby possible to perform printing at high speed.

(2) When generating the image file processed on the DSC 3012, the UI based on function information obtained from the PD printer 1000 is generated and displayed by the DSC 3012 so as to set for a user the print conditions using the UI. Therefore, it is possible to perform the printing process based on the printing functions of the PD printer 1000.

(3) It is possible to transmit and print the image file by notifying the timing for starting generation of the image file from the PD printer 1000 to the DSC 3012 and notifying the completion of generation of the image file from the DSC 3012 to the PD printer 1000 so as to perform highly reliable printing synchronizing mutual processes.

(4) The image file to be printed generated from the image file stored in the memory card 3109 is erased on completion of the transfer of the image file to the PD printer 1000, which can prevent an already printed image file from remaining in the memory of the DSC 3012 and reducing the remaining amount of the memory.

Second Embodiment

Figure 9:
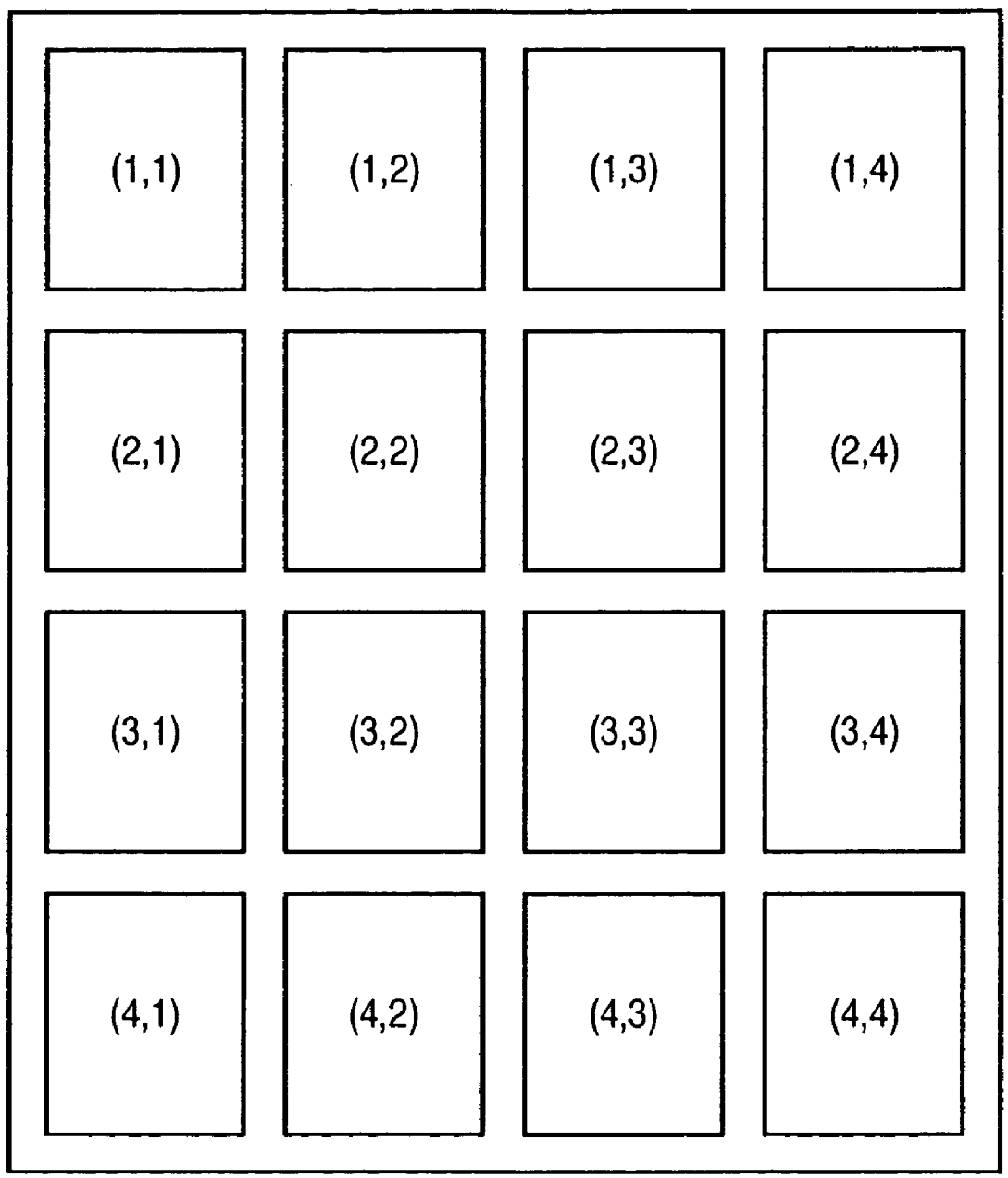
FIG. 9 is a diagram showing an example of a printing result of an image according to a second embodiment of the present invention.

Next, a second embodiment of the present invention will be described. As shown in FIG. 9, the case of laying out (n-up) multiple pieces of image data in a sheet of paper and performing printing will be described in the second embodiment. As the hardware configurations of the DSC 3012 and PD printer 1000 according to the second embodiment are the same as those of the aforementioned first embodiment, a description thereof will be omitted.

FIG. 9 is a diagram showing an example of the printing result of the image according to the second embodiment of the present invention.

This example shows the case of printing total 16 images of a row (line) direction (N=4)×a column direction (M=4) (16-up printing) in a sheet. (N, M) (N=1 to 4, M=1 to 4) of each image indicates a position of each image.

Figure 10A:
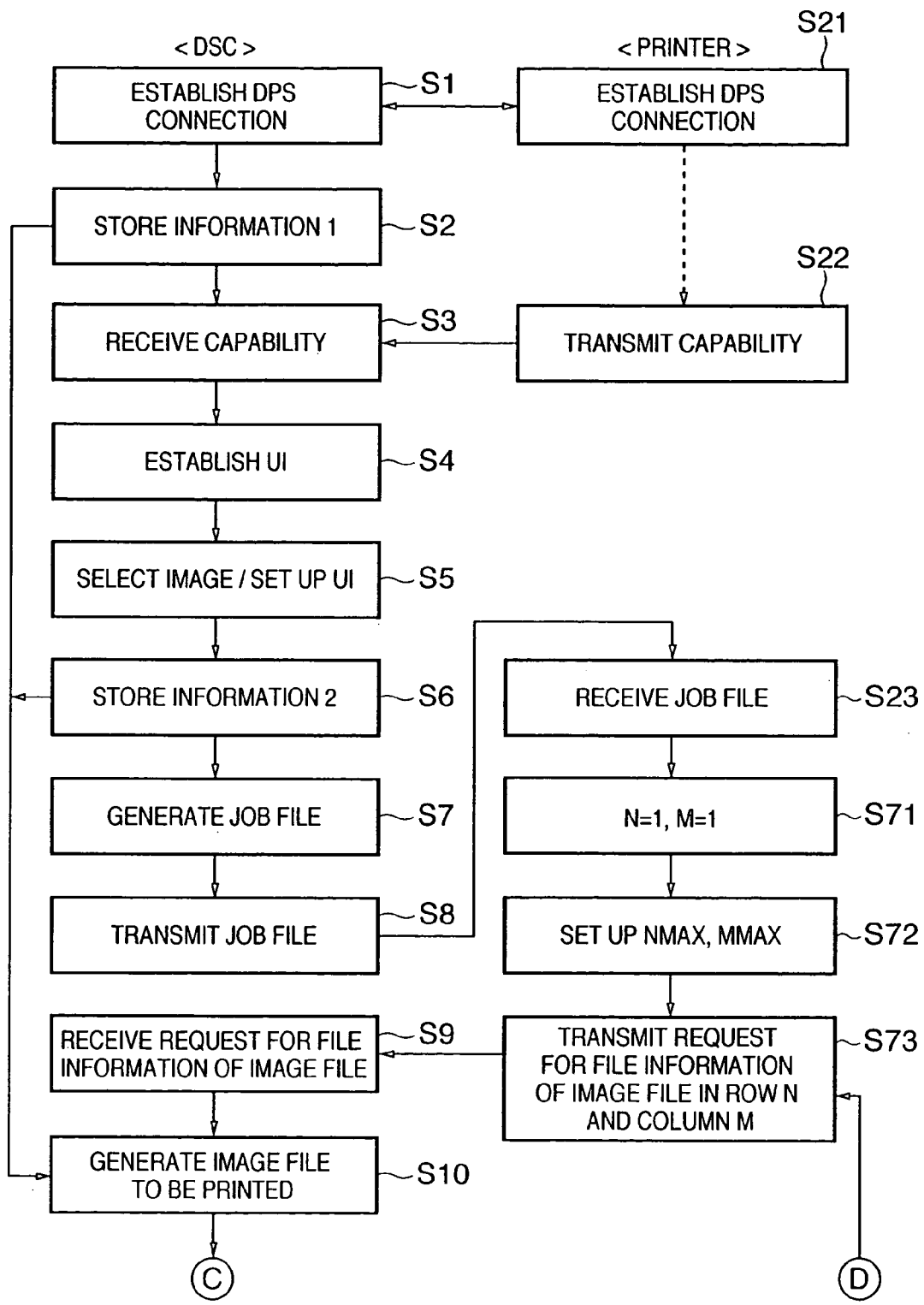
FIGS. 10A and 10B are diagrams for describing a process in the case of performing communication between the DSC and the PD printer and supplying the image data from the DSC to the PD printer to perform n-up layout printing according to the second embodiment of the present invention.
Figure 10B:
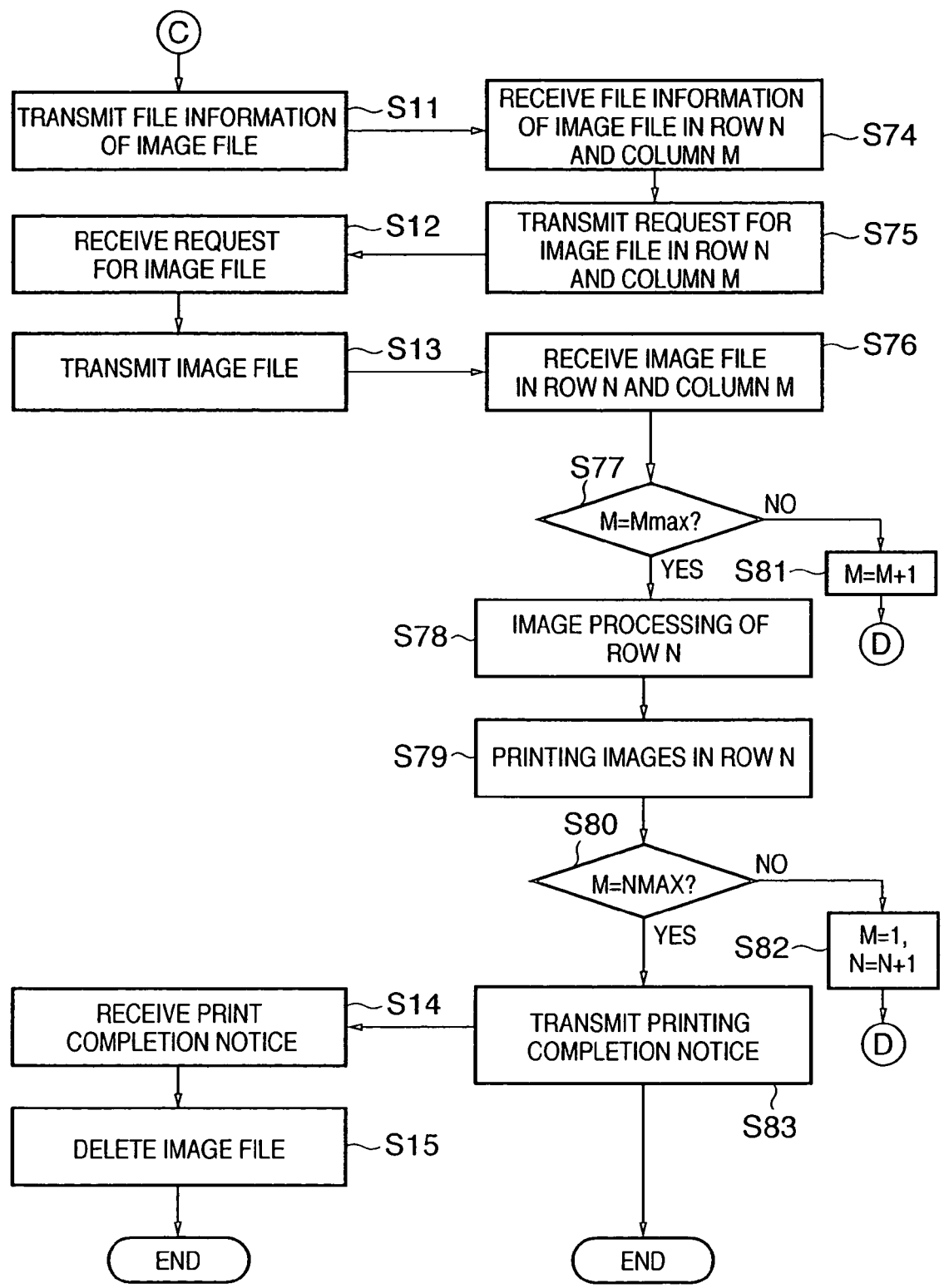

FIGS. 10A and 10B are diagrams for describing the process in the case of performing communication between the digital camera (DSC) 3012 and the PD printer 1000 and supplying the image data from the DSC 3012 to the PD printer 1000 to perform n-up layout printing according to the second embodiment of the present invention. In FIGS. 10A and 10B, the same processes as those of the aforementioned FIGS. 6A and 6B will be given the same symbols and a description thereof will be omitted. However, the UI created in the step S5 includes a 16-up function as a layout. The "information 2" stored in the step S6 has 16-up specified by the user, and the print job file generated in the step S7 includes the layout printing of the 16-up.

Hereunder, a description will be given by centering on the process on the PD printer 1000.

On receiving the print job file including the n-up printing from the DSC 3012 in the step S23, it initializes both the row direction variable N and column direction variable M for managing an image position on a paper to "1". These variables are recorded in the memory 3003. Next, in a step S72, it acquires a maximum number of images in the row direction Nmax and a maximum number of images in the column direction Mmax from layout specification information described in the print job file received in the step S23 so as to set them in the memory 3003. It is Nmax=Mmax=4 in the example of FIG. 9.

Next, in a step S73, it transmits the "request for information of an image file" in the row N and column M (first row and first column at first) to the DSC 3012. On receiving the "request for image file information" in the step S9, the DSC 3012 advances to the step S10, and generates the image file to be printed from the requested image file. The aforementioned "information 1" and "information 2" are referred to when generating the image file to be printed as in the case of the aforementioned FIGS. 6A and 6B. And in the step S11, the DSC transmits the file information of the generated image file to be printed to the PD printer 1000.

The PD printer 1000 receives the image file information (image file in the row N and column M) in a step S74. Next, in a step S75, it issues the "request for image file" to the DSC 3012 to obtain the image file to be printed in the row N and column M as in the case of the aforementioned first embodiment. On receiving this (step S12), the DSC 3012 transmits the image file generated in the step S10 to the PD printer 1000 (step S13). In the second embodiment, the "request for image file" transmitted in the step S75 is an image transfer request from the PD printer 1000 to the DSC 3012. This synchronizes the image file generated on the DSC 3012 and the image file received by the PD printer 1000. On receiving the image file in a step S76, the PD printer 1000 advances to a step S77 and determines whether or not the image is the one in an Mmax-th ($4^{th}$ in the example of FIG. 9) column.

This is because, as is evident from the example of FIG. 9, it is necessary to have the data equivalent to at least one scan of the print head when performing printing with the print head on the printer engine 3004, and so the image data on the images in the $4^{th}$ column should be received. If below Mmax, it advances to a step S81, adds 1 to the variable M and advances to the step S73 so as to start the process for obtaining the image data on the images in one row and two columns. Thus, if it has the image data of Mmax columns in the step S77, it advances to a step S78 and processes the image data on the images positioned in the row N to convert it to the data to be outputted to the print head so as to print the images in the row N in a step S79. Thus, an image (1, 1), an image (1, 2), an image (1, 3) and an image (1, 4) are printed in the example of FIG. 9. And in a step S80, it determines whether or not N=Nmax. If not, it sets them to the variable M=1, the variable N=N+1 in a step S82 and advances to the step S73 so as to obtain the image data on the images in the next row.

Here, in the case where length of the print head and width of the image are not in a relation of integral multiplication, there occurs a situation in which the images in the next lines, that is, some parts of an image (2, 1), an image (2, 2), an image (2, 3) and an image (2, 4) are printed in parallel while printing the images including lines of the image (1, 1), image (1, 2), image (1, 3) and image (1, 4). In that case, it is necessary to obtain the image data on the next row images by implementing the step S80 and S82 after the step S78.

Once all the images in the row N and column M are thus printed in the step S80, it advances to a step S83 and finishes the process by transmitting a "printing completion notice" to the DSC 3012. Thus, on receiving the "printing completion notice" from the PD printer 1000 in the step S14, the DSC 3012 deletes all the image files to be printed generated so far so as to finish the process in the step S15.

As described above, according to the second embodiment, the DSC 3012 generates the image file to be printed of each image according to the request from the PD printer 1000 during the n-up printing. In this case, the image files equivalent to n pieces of image are stored in these n-up images so that, if there is the same image, the image file to be printed having it stored therein can be used as they are.

In the case where the memory capacity of the DSC 3012 is limited from a viewpoint of cost of the DSC 3012, it may not be possible to simultaneously hold the image files equivalent to n pieces of image. In such a case, it is feasible, on receiving the "request for image file information in the row N and column M" from the PD printer 1000 (step S9), to erase the printed image files before then and newly generate a next new image file to be printed in the step S10.

In the above description, in the case where the memory capacity of a receive buffer or a print buffer of the PD printer 1000 is small, it is feasible to implement the printing process in the step S79 halfway only with the data completely received and then obtain the image data of "the image file to be printed" of the image which is missing so as to perform the printing operation.

Other Embodiment

In the case of printing the image data of the same image file repeatedly with the same print conditions in the above-mentioned first and second embodiments, it is feasible for the DSC 3012 to determine whether or not the same image file is requested as to the "request for image file information" received in the step S9. In the case of the same image file, it is already loaded into the RAM 3102 of the DSC 3012 and so it should be read and transmitted to the PD printer 1000 in the step S13.

It is thereby possible to reduce the number of times of the generation process of the image file to be printed in the DSC so as to allow higher-speed printing.

It is also possible to transmit the command or data indicating that it is the printing of the same image file (data) as last time from the DSC 3012 to the PD printer 1000 so that the PD printer 1000 prints the same image by using the print data previously stored in the printer. It is thereby possible to perform printing while further reducing the number of times of transmission.

As previously described, the object of the present invention can also be achieved by providing a storage medium having a program code of software for implementing the functions of the embodiments recorded therein to a system or an apparatus to have the program code stored in the storage medium read and executed by a computer (or a CPU or an MPU) of the system or the apparatus. In this case, the program code itself read from the storage medium implements the functions of the aforementioned embodiments, and so the storage medium having the program code stored therein configures the present invention. As for the storage medium for supplying such a program code, it is possible to use a floppy (registered trademark) disk, a hard disk, an optical disk, a magnet-optical disk, a CD-ROM, a CD-R, a magnetic tape, a nonvolatile memory or an ROM.

In addition to implementing the functions of the aforementioned embodiments by having the program code read and executed by the computer, it includes the case where an OS (Operating System) running on the computer performs a part or all of the actual process based on the instructions of the program code and the functions of the aforementioned embodiments are implemented by that process.

Furthermore, it includes the case where the program code read from the storage medium is written to the memory provided to an expansion board inserted into the computer or an expansion unit connected to the computer, and then the CPU provided to the expansion board or the expansion unit performs a part or all of the actual process based on the instructions of the program code so as to have the functions of the aforementioned embodiments implemented by that process.

The present invention is not limited to the above embodiment, and various changes and modifications can be made thereto within the spirit and scope of the present invention. Therefore, to apprise the public of the scope of the present invention, the following claims are made.

CLAIM OF PRIORITY

This application claims priority from Japanese Patent Application No. 2004-241203 filed on Aug. 20, 2004, which is hereby incorporated by reference herein.

What is claimed is:

1. A printing system having an image supply device and a printer, for printing an image with the printer based on image data supplied from the image supply device, wherein:
the image supply device comprises:
a print setting unit constructed to set print conditions for a designated image file;
a job transmission unit constructed to transmit a print job for instructing print of the designated image file;
a determination unit constructed to determine whether or not image data of the designated image file is to be converted, based on the print conditions set by the print setting unit;
a conversion unit constructed to execute conversion of the image data of the designated image file according to the print conditions set by the print setting unit, wherein the conversion includes at least one of resizing, color conversion and rotation of the image data;
a file information transmission unit constructed to transmit file information of the designated image file, in response to a file information request for requesting file information of the designated image file using a file ID of the image file, wherein the file information represents a file size of the image file, and wherein the file information request is received from the printer and requests file information of the designated image file instructed in the print job but not the image data of the image file; and
a file transmission unit constructed to transmit the image data of the designated image file, in response to an image file request for requesting the image data of the designated image file using the file ID of the designated image file instructed in the print job, wherein the image file request is received from the printer, wherein, if the determination unit determines that the image data of the designated image file is not to be converted, in response to the file information request for requesting file information of the designated image file using the file ID of the designated image file, the file information transmission unit transmits the file information of the designated image file to the printer, and, in response to the image file request for requesting the image data of the designated image file using the file ID of the designated image file, the file transmission unit transmits the image data of the designated image file to the printer, and
wherein, if the determination unit determines that the image data of the designated image file is to be converted, in response to the file information request for requesting the file information of the designated image file, the conversion unit starts conversion of the image data of the designated image file requested by the file information request according to the print conditions set by the print setting unit, and the file information transmission unit transmits file information of a converted image file whose image data has been converted by the conversion unit, but does not transmit the file information of the designated image file, and, in response to the image file request for requesting the image data of the designated image file, the file transmission unit transmits the image data of the converted image file, but does not transmit the image data of the designated image file, and wherein the printer comprises:
a file information request unit constructed to transmit the file information request for requesting the file information of the designated image file using the file ID of the designated image file instructed in the print job from the image supply device;
a file request unit constructed to transmit the file request for requesting the image data of the designated image file using the file ID of the designated image file instructed in the print job, after receiving the file information transmitted by the file information transmission unit in response to the file information request; and
a print unit constructed to print an image based on the image data transmitted by said file transmission unit in response to the image file request.

2. The print system according to claim 1, wherein the image supply device further comprises an obtaining unit constructed to obtain information of the printer upon communication between the image supply device and the printer, wherein said conversion unit converts the image data of the designated image file in accordance with the obtained information of the printer and the print conditions set by said print setting unit.

3. The print system according to claim 2, wherein the information obtained by said obtaining unit includes at least one of version information of a communication protocol, vendor information of the printer, type information of the printer and status information of the printer.

4. The print system according to claim 1, wherein the print conditions include at least one of a paper size and a layout of print.

5. The print system according to claim 1, wherein the image supply device further comprises a storage unit constructed to store the image data converted by said conversion unit as the converted image file, and wherein the image supply device deletes the converted image file stored in said storage unit after completion of print of the image data of the converted image file.

6. The print system according to claim 1, wherein the image supply device further comprises a storage unit constructed to store the image data converted by said conversion unit as the converted image file, and wherein the image supply device deletes the converted image file stored in said storage unit upon receiving a file information request of another image file from the printer.

7. The print system according to claim 1, wherein the file information includes size information of the designated image file or the converted image file.

8. An image supply device for directly communicating with a printer and supplying image data to the printer, comprising:
- a print setting unit constructed to set print conditions for a designated image file;
- a job transmission unit constructed to transmit a print job for instructing print of the designated image file;
- a determination unit constructed to determine whether or not image data of the designated image file is to be converted, based on the print conditions set by the print setting unit;
- a conversion unit constructed to execute conversion the image data of the designated image file according to the print conditions set by the print setting unit, wherein the conversion includes at least one of resizing, color conversion and rotation of the image data;
- a file information transmission unit constructed to transmit file information of the designated image file, in response to a file information request for requesting file information of the designated image file using a file ID of the image file, wherein the file information represents a file size, and wherein the file information request is received from the printer and requests file information of the designated image file instructed in the print job but not the image data of the image file; and
- a file transmission unit constructed to transmit the image data of the designated image file, in response to an image file request for requesting the image data of the designated image file using the file ID of the designated image file instructed in the print job, wherein the image file request is received from the printer, wherein, if the determination unit determines that the image data of the designated image file is not to be converted, in response to the file information request for requesting file information of the designated image file using the file ID of the designated image file, the file information transmission unit transmits the file information of the designated image file to the printer, and, in response to the image file request for requesting the image data of the designated image file using the file ID of the designated image file, the file transmission unit transmits the image data of the designated image file to the printer, and wherein, if the determination unit determines that the image data of the designated image file is to be converted, in response to the file information request for requesting the file information of the designated image file, the conversion unit starts conversion of the image data of the designated image file requested by the file information request, according to the print conditions set by the print setting unit, and the file information transmission unit transmits file information of a converted image file whose image data has been converted by the conversion unit, but does not transmit the file information of the designated image file, and, in response to the image file request for requesting the image data of the designated image file, the file transmission unit transmits the image data of the converted image file, but does not transmit the image data of the designated image file.

9. The image supply device according to claim 8, further comprising an obtaining unit constructed to obtain information of the printer upon communication between the image supply device and the printer, wherein said conversion unit converts the designated image data of the image file in accordance with the obtained information of the printer and the print conditions set by said print setting unit.

10. The image supply device according to claim 9, wherein the information obtained by said obtaining unit includes at least one of version information of a communication protocol, vendor information of the printer, type information of the printer and status information of the printer.

11. The image supply device according to claim 8, wherein the print conditions include at least one of a paper size and a layout of print.

12. The image supply device according to claim 8, further comprising a storage unit constructed to store the image data converted by said conversion unit as the converted image file, wherein the converted image file stored in said storage unit is deleted after completion of print of the image data of the converted image file.

13. The image supply device according to claim 8, further comprising a storage unit constructed to store the image data converted by said conversion unit as the converted image file, wherein the converted image file stored in said storage unit is deleted upon receiving a file information request of another image file from the printer.

14. The image supply device according to claim 8, wherein the file information includes size information of the designated image file or the converted image file.

15. A control method of an image supply device for directly communicating with a printer and supplying image data to the printer, comprising:
- a setting step of setting print conditions for a designated image file;
- a job transmitting step of transmitting a print job for instructing print of the designated image file;
- a determination step of determining whether or not image data of the designated image file is to be converted, based on the print conditions set in the setting step;
- a conversion step of executing conversion of the image data of the designated image file according to the print conditions set in the setting step, wherein the conversion includes at least one of resizing, color conversion and rotation of the image data;
- a file information transmission step of transmitting file information of a designated image file, in response to a file information request for requesting file information of the designated image file, wherein the file information represents a file size, and the file information request is received from the printer and requests file information of the designated image file instructed in the print job, but not the image data of the image file; and
- a file transmission step of transmitting the image data of the designated image file, in response to an image file request for requesting the image data of the designated image file using the file ID of the designated image file instructed in the print job, wherein the image file request is received from the printer, wherein, if the determination step determines that the image data of the designated image file is not to be converted, in response to the file information request for requesting file information of the designated image file using the file ID of the designated image file, the file information transmission step transmits the file information of the designated image file to the printer, and, in response to the image file request for requesting the image data of the designated image file using the file ID of the designated image file, the file transmission step transmits the image data of the designated image file to the printer, and wherein, if the determination step determines that the image data of the designated image file is to be converted, in response to the file information request for requesting the file information of the designated image file, the conversion step starts conversion of the image data of the designated image file requested by the file information request according to the print conditions set in the print setting step, and the file information transmission step transmits file information of a converted image file whose image data has been converted in the conversion step but does not transmit the file information of the designated image file, and, in response to the image file request for requesting the image data of the designated image file, the file transmission step transmits the image data of the converted image file, but does not transmit the image data of the designated image file.

* * * * *